US012698991B2

(12) United States Patent
Sonnenberg et al.

(10) Patent No.: US 12,698,991 B2
(45) Date of Patent: Aug. 4, 2026

(54) FLUID METER FOR DETECTING A FLOW QUANTITY AND/OR A FLOW RATE OF A FLUID FLOWING THROUGH A MEASURING SECTION AND METHOD FOR ASSEMBLING A FLUID METER

(71) Applicants: Diehl Metering GmbH, Ansbach (DE); Diehl Metering S.A.S., Saint Louis (FR)

(72) Inventors: Hans-Michael Sonnenberg, Neuendettelsau (DE); Guy Bach, Waldighofen (FR)

(73) Assignees: Diehl Metering GmbH, Ansbach (DE); Diehl Metering S.A.S., Saint Louis (FR)

( * ) Notice: Subject to any disclaimer, the term of this patent is extended or adjusted under 35 U.S.C. 154(b) by 414 days.

(21) Appl. No.: 18/467,890

(22) Filed: Sep. 15, 2023

(65) Prior Publication Data

US 2024/0102839 A1    Mar. 28, 2024

(30) Foreign Application Priority Data

Sep. 26, 2022    (DE) ..................... 10 2022 124 709.0

(51) Int. Cl.
*G01F 1/66* (2022.01)
*G01F 1/667* (2022.01)
*G01F 1/84* (2006.01)

(52) U.S. Cl.
CPC .............. *G01F 1/662* (2013.01); *G01F 1/667* (2013.01); *G01F 1/849* (2013.01)

(58) Field of Classification Search
CPC ........... G01F 1/662; G01F 1/667; G01F 1/849
USPC ....................................................... 73/861.27
See application file for complete search history.

(56) References Cited

U.S. PATENT DOCUMENTS 11,199,427 B2    12/2021    Cakebread
2015/0033873 A1*    2/2015    Drachmann ............ G01F 1/662
                                                        73/861.18

* cited by examiner

*Primary Examiner* — Nathaniel T Woodward
(74) *Attorney, Agent, or Firm* — Laurence A. Greenberg; Werner H. Stemer; Ralph E. Locher

(57) ABSTRACT

A fluid meter for detecting a flow quantity and/or flow rate of a fluid flowing through a measuring section includes a measuring section part forming the measuring section, and a measuring device fastened to the measuring section part and projecting into the measuring section through an opening in the measuring section part, for detecting a measured value relating to the flow quantity and/or flow rate and/or emitting a measurement signal detecting the measured value. A measuring device fastening element is connected to the measuring device, and a measuring section fastening element is fastened to the measuring section part. The measuring device fastening element is plugged onto or in the measuring section fastening element. A locking element is plugged into each receiving region of the fastening elements and forms a form-locking connection with the fastening elements to fasten the measuring device on the measuring section part.

17 Claims, 6 Drawing Sheets

1

FLUID METER FOR DETECTING A FLOW QUANTITY AND/OR A FLOW RATE OF A FLUID FLOWING THROUGH A MEASURING SECTION AND METHOD FOR ASSEMBLING A FLUID METER

CROSS-REFERENCE TO RELATED APPLICATION

This application claims the priority, under 35 U.S.C. § 119, of German Patent Application DE 10 2022 124 709.0, filed Sep. 26, 2022; the prior application is herewith incorporated by reference in its entirety.

FIELD AND BACKGROUND OF THE INVENTION

The present invention relates to a fluid meter for detecting a flow quantity and/or a flow rate of a fluid flowing through a measuring section.

Fluid meters include a plurality of components, such as housing parts and measuring devices, which have to be fastened to one another during the assembly of the fluid meter. A problem occurs in that the fasteners should not be readily releasable, in particular in order to prevent unauthorized opening of the fluid meter and any manipulation. There is a known practice of providing screw connections as fastening devices, in which seals which are destroyed when the fluid meter is opened are used to prevent manipulation. In addition, the prior art discloses latching fastenings, for example in U.S. Pat. No. 11,199,427 B2.

SUMMARY OF THE INVENTION

It is accordingly an object of the invention to provide an improved fluid meter for detecting a flow quantity and/or a flow rate of a fluid flowing through a measuring section and a method for assembling a fluid meter, which overcome the hereinafore-mentioned disadvantages of the heretofore-known meters and methods of this general type and which, in particular, provide the simplest possible assembly and the most reliable possible protection against manipulation.

With the foregoing and other objects in view there is provided, in accordance with the invention, a fluid meter for detecting a flow quantity and/or a flow rate of a fluid flowing through a measuring section, the fluid meter comprising at least one measuring section part, which forms or includes the measuring section, and at least one measuring device, which is fastened to the measuring section part and projects into the measuring section through an opening of the measuring section part and through the use of which a measured value relating to the flow quantity and/or the flow rate can be detected and/or a measurement signal that can be used to detect the measured value can be emitted, at least one measuring device fastening element is connected to the measuring device or is integrally formed thereon, and at least one measuring section fastening element is fastened to the measuring section part or is integrally formed thereon, the measuring device fastening element is plugged onto the measuring section fastening element or plugged at least sectionally therein, and at least one locking element, which is plugged into in each case one receiving region of the fastening elements, forms a form-locking connection with the fastening elements to fasten the measuring device on the measuring section part.

The invention is based on the concept that, due to their geometric shape and their arrangement with respect to one another, the measuring device fastening element, the measuring section fastening element and the locking element interact in such a way that they are securely attached to one another, even in the case of the action of a force. This applies particularly to forces acting on the fluid meter from the outside. However, the parts forming the form-locking connection or the form-locking fastening preferably also interact in such a way that a force on the measuring device caused by the pressure of the fluid flowing through the measuring section is dissipated to the measuring section part or its measuring section fastening element through the measuring device fastening element and the locking element. Thus, in the case of the fluid meter according to the invention, the measuring device is fixed on the measuring section part in an effective and low-cost way, while, in particular since fastening through the use of screw connections and sealing is not necessarily required, the assembly effort is significantly reduced.

Two plug-in processes are required for the assembly of the fluid meter according to the invention. During the first plug-in process, the measuring device fastening element is plugged onto or into the measuring section fastening element. During the second plug-in process, the locking element is plugged into the, in particular aligned, receiving regions of the fastening elements, thereby forming the form-locking connection between these components. The terms "plugging into" and "plugging onto" can be understood to mean a movement of the respective component that takes place exclusively linearly, in particular in a straight line, in which a projecting region of this component is introduced into a corresponding recess or the receiving region, respectively, or vice versa. In order to implement the form-locking connection, provision is preferably made for the plug-in directions to be at an angle, in particular perpendicular, to one another. This relates to the direction of movement of the measuring device fastening element when the latter is plugged onto or into the measuring section fastening element, and the direction of movement of the locking element when the latter is plugged into the receiving regions. In the case of the fluid meter according to the invention, a completely screwless connection is preferably implemented, thereby making assembly substantially simpler.

The measuring device projects through the opening, which is disposed, for example, laterally on the measuring section, into the measuring section, thus ensuring that the measuring device and the fluid are in contact with one another and thus an interaction between the measuring device and the fluid is possible. A sealing element, in particular a sealing ring, can be disposed in the region of the opening, thus ensuring fluid tightness of the measuring section or of the measuring section part. The interaction between the measuring device and the fluid enables the measured value to be detected and/or the measurement signal to be emitted.

The measured value can be understood to mean a sensor signal, for example an electrical sensor signal, on the basis of which the flow quantity or flow rate can be determined. For this purpose, the sensor signal can be transmitted to an evaluation device of the fluid meter. In order to detect the measured value or the sensor signal, it may be necessary for the measurement signal to be emitted into the fluid beforehand. This measurement signal interacts with the fluid in accordance with the flow quantity or rate, wherein the measured value depends on the measurement signal and the associated interaction. It is thereby possible to determine the flow quantity or rate. The measurement signal can be an ultrasonic signal emitted into the fluid, in which case the measured value relates to the ultrasonic signal after it has interacted with the fluid.

The flow quantity can be understood to mean the cumulative amount of the fluid which has flowed through the measuring section or the fluid meter from a specific reference time, for example the assembly time or the last reading time. The unit of the flow quantity can be "liters" or "cubic meters." The flow rate can be understood to mean the volume of the fluid which is currently flowing through the measuring section or the fluid meter per unit of time. The unit of the flow rate can be "liters per second" or "cubic meters per minute."

The measuring section part and the measuring section fastening element can be separate components fastened to one another. Alternatively, these components can be provided as a common, in particular one-piece or one-material element. The same applies to the measuring device and the measuring device fastening element, which can likewise be provided as separate components or as a one-piece or one-material element. The measuring device fastening element can include a pot-shaped section, into which the measuring device is inserted and fastened, for example by an adhesive.

As a particular preference, at least two locking elements are provided, which are disposed on opposite sides of the measuring section part. In contrast to the case in which only one locking element is provided, the region forming the form-locking connection extends over a larger section of the fluid meter, and therefore the latter is even more stable and reliable. The group including the measuring device fastening element, the measuring section fastening element and the locking element can be formed symmetrically, in particular axially symmetrically, with respect to a longitudinal direction of the measuring section. This is advantageous particularly because the pressure forces of the fluid typically act symmetrically on the measuring device and thus optimum force dissipation is achieved.

In a preferred embodiment of the fluid meter according to the invention, it is envisaged that the measuring device fastening element and/or the measuring section fastening element and/or the locking element have/has at least one latching section, which latches in when the locking element is plugged in to secure the form-locking connection. The latching section can be attached to a latching arm which springs back as it is plugged in and latches in when the assembly position is reached. The latching connection is preferably formed in a section of the fluid meter which is remote or faces away from the surface of the fluid meter and which is not accessible or is accessible only with extreme difficulty manually and/or by a tool such as a screwdriver. As a particular preference, the latching connection can only be released by destroying the respective component, in particular the locking element, thus ensuring that unauthorized opening of the fluid meter and hence manipulation are no longer possible without being noticed. The component to be destroyed to open the fluid meter preferably is formed of a plastic and takes over the function of the seals known from the prior art, which can therefore be eliminated from the fluid meter according to the invention.

It is conceivable that the measuring section part is a housing which forms the tubular measuring section. The housing can be or form a tube, the interior of which represents the measuring section. The housing can be box-shaped, in particular cuboidal, wherein the measuring section is formed by a tubular section of the housing.

The locking element can be at least one fastening pin or can include at least one such fastening pin, wherein at least one of the receiving regions is a bore or includes a bore into which the fastening pin engages or through which it engages. The bore preferably has a slightly larger diameter than the fastening pin, ensuring that, during assembly, on the one hand, there is a certain amount of play to compensate for any manufacturing tolerances and, on the other hand, a sufficiently stable form-locking is formed for the implementation of the connection or fastening.

The locking element can have a flat or plate-shaped central section, from which a plurality of fastening pins projects parallel to one another. The insertion or plugging in or on of the locking element into the receiving regions is accomplished by a common plug-in movement of the fastening pins into the respective bores. In addition, latching arms having the latching section can project from the central section.

The plug-in or plug-on direction of the measuring device fastening element onto the measuring section fastening element and the plug-in direction of the locking element into the receiving region can be perpendicular to one another or at an angle to one another which differs from the right angle by an angular amount, wherein the angular amount is between 1° and 30°, preferably between 1° and 10°, in particular 5°. The deviation of the plug-in directions from the right angle has the effect of preventing spontaneous release or opening of the fastening. Since the measuring device fastening element and/or measuring section fastening element and/or the locking element can be formed of an elastically deformable material, such as, for example, plastic, there is the possibility that, in the event of the action of a force, e.g. due to the fluid pressure, these components deform elastically in such a way that a transverse force acting on the locking element arises, acting on the measuring section fastening element along the plug-in or plug-on direction of the measuring device fastening element, and this transverse force could bring about release of the locking element. If the plug-in direction of the locking element runs at an angle to the effective direction of the transverse force, such release can be avoided.

The measuring device fastening element and/or the measuring section fastening element can be at least one fastening rib or can have at least one such fastening rib. The rib structures of the fastening elements can represent mutual negatives, thus ensuring that plugging in or on takes place as a guided movement which ends automatically in the assembly position of the respective component.

Provision can be made for the measuring section fastening element to include two fastening ribs, which are disposed on opposite sides of the measuring section part and have L shapes facing away from one another when viewed in cross section, wherein the measuring device fastening element includes two fastening ribs, which, when viewed in cross section, run parallel to one another and rest with their sides in each case against an end face of one of the fastening ribs of the measuring section fastening elements, wherein the locking elements in each case engage through the receiving region of the respective measuring device fastening element, which receiving region is configured as at least one bore, and engage in the receiving region of the measuring section fastening element, which receiving region is delimited by the angled section of the L shape of the measuring section fastening element. The fastening ribs extend parallel to the longitudinal axis of the measuring section or of the measuring section part. In order to further stabilize the form-locking connection, additional ribs can be provided, for example on the measuring section fastening element. These can likewise be disposed laterally and opposite one another on the measuring section part and, to reinforce the form-locking connection, can each be surrounded by an angled section on the end of the respective locking element.

It is furthermore conceivable that the measuring device fastening element or the measuring section fastening element is at least one web or includes at least one such web, and the respective other fastening element is at least one groove or includes at least one such groove, wherein the web engages in the groove. The web and the groove can have an elongate or elongated geometric shape. The groove can be of slightly larger dimensions than the web, thus enabling the web to be pushed into the groove without problems, even when there are component tolerances.

As regards the groove/web connection, it is conceivable that the fastening element including the groove, in particular a plurality of grooves, is of block-shaped configuration, and the fastening element including the web, in particular a plurality of webs, is of plate-shaped or dish-shaped configuration, wherein the plate-shaped or dish-shaped fastening element rests on the block-shaped fastening element. The block-shaped fastening element can have a cuboidal or cylindrical shape. The dimensions of the mutually abutting surfaces of the plate-shaped and cuboidal or of the plate-shaped and cylindrical fastening elements can be matched to one another, in particular can be the same.

As a particular preference, a plurality of pairs disposed along the measuring section, each including a measuring section fastening element and a measuring device fastening element, are disposed on the measuring section part. In this embodiment, a particularly high degree of stability of the form-locking connection with respect to the direction along the measuring section is achieved.

The measuring device fastening element and/or the measuring section fastening element can have at least one elastic return element, which can be deformed, while generating an elastic restoring force, when the measuring device fastening element is plugged into or onto the measuring section fastening element. Consequently, the elastic return element is under stress in such a way, when the form-locking connection is formed, that component tolerances or any play between the fastening elements and the locking element is eliminated. For assembly, the measuring device fastening element is pushed into or onto the measuring section fastening element, for which purpose a force that brings about the elastic deformation of the return element must be applied. This continues until the measuring device fastening element has reached the final assembly position. The locking element is then inserted into the receiving regions, with the result that the form-locking connection is formed by the application of the elastic restoring force to the locking element.

The elastic return element can preferably be at least one elastic spring arm or include at least one such spring arm. The longitudinal direction of the spring arm preferably extends substantially at right angles to the direction in which the measuring device fastening element is plugged into or onto the measuring section fastening element. The restoring force then comes about as a result of a bending stress produced during the bending of the spring arm.

In the case of the fluid meter according to the invention, provision can be made for at least one evaluation device, which is configured for evaluation of the measurement signal and is connected to the measuring device, to be disposed in an electronics housing of the fluid meter. The connection provided for signal transmission between the measuring device and the evaluation device can be accomplished through electrical cables or electromagnetic induction.

The electronics housing can have a main section, which forms a base surface and side surfaces, and a housing cover, which closes the electronics housing at the top. The housing cover can have a viewing window, making the evaluation device visible to the outside and enabling a current meter reading displayed thereon to be read. A transparent pane can be disposed between the main section and the housing cover. The electronics housing can be sealed in a fluid-tight manner in order to protect the evaluation device from moisture.

The fluid meter according to the invention can have a jacket housing having at least one housing shell, which surrounds the electronics housing at least in some section or sections, wherein the housing shell and the locking element are a common, in particular one-piece, component. The electronics housing and the jacket housing thus form a nested structure, which makes unauthorized opening of the fluid meter even more difficult. If the locking element and the housing shell are a one-piece component, the locking element can only be released as a result of destruction, it is necessary to exchange the locking element and the housing shell if the fluid meter is opened and subsequently reclosed.

As a particular preference, the fluid meter according to the invention is a water meter. The fluid meter according to the invention can be an ultrasonic meter. The measuring device projecting into the measuring section is or includes an ultrasound generating device for emitting ultrasonic waves representing the measurement signal into the fluid and/or an ultrasound detection device, through the use of which the measured value is detected or acquired on the basis of the ultrasonic waves passing through the fluid. The fluid meter can be a magnetic-inductive flow meter. Details with regard to ultrasonic meters and magneto-inductive flow meters and, in particular, their measurement concepts are sufficiently well known to those skilled in the art and will not be explained more specifically at this point.

With the objects of the invention in view, there is concomitantly provided a method for assembling a fluid meter for detecting a flow quantity and/or a flow rate of a fluid flowing through a measuring section, which comprises providing the fluid meter with at least one measuring section part, which forms or includes the measuring section, and at least one measuring device, which is fastened to the measuring section part and projects into the measuring section through an opening of the measuring section part and through the use of which a measured value relating to the flow quantity and/or the flow rate can be detected and/or a measurement signal that can be used to detect the measured value can be emitted, at least one measuring device fastening element is connected to the measuring device or is integrally formed thereon, and at least one measuring section fastening element is fastened to the measuring section part or is integrally formed thereon, in order to fasten the measuring device on the measuring section part, the measuring device fastening element is plugged onto the measuring section fastening element or plugged at least sectionally therein, and then at least one locking element is plugged into in each case one receiving region of the fastening elements, thus forming a form-locking connection with the fastening elements. All the advantages and features explained in connection with the fluid meter according to the invention can be transferred equally to the method according to the invention and vice versa.

The measuring device fastening element and/or the measuring section fastening element can be formed, at least in part, of a plastic and/or a metal. The locking element preferably likewise is formed of a plastic.

Other features which are considered as characteristic for the invention are set forth in the appended claims.

Although the invention is illustrated and described herein as embodied in a fluid meter for detecting a flow quantity and/or a flow rate of a fluid flowing through a measuring section and a method for assembling a fluid meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
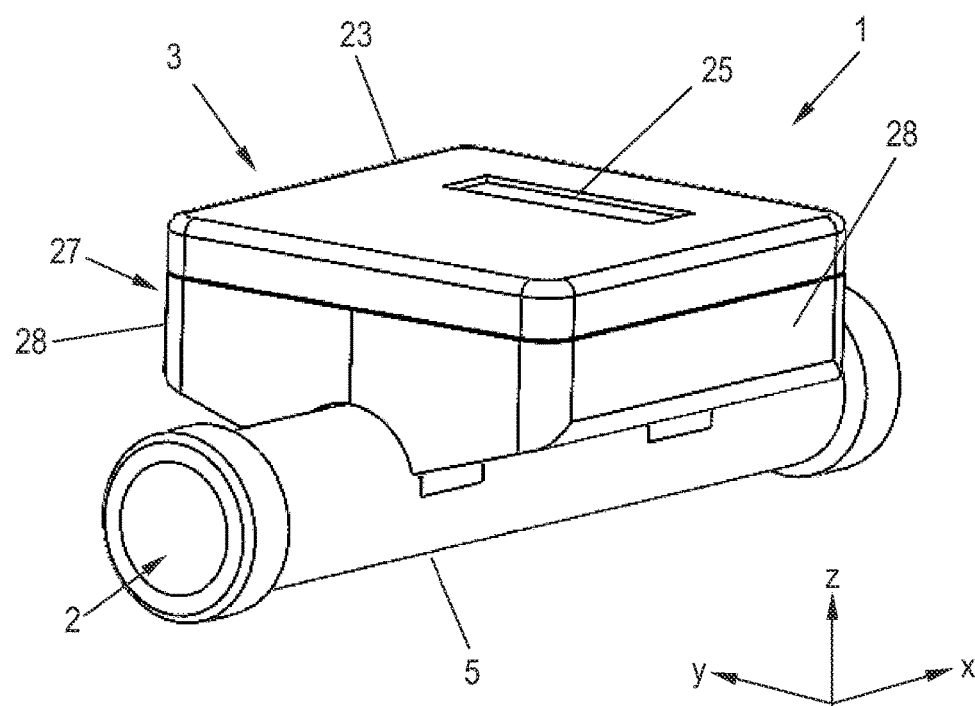
FIG. 1 is a diagrammatic, perspective view of a first exemplary embodiment of the fluid meter according to the invention.

Referring now to the figures of the drawings in detail and first, particularly, to FIGS. 1 to 6 thereof, there is seen a fluid meter 1 according to the invention in accordance with a first exemplary embodiment, or its components. The fluid meter 1 has a measuring section 2, through which a fluid, in the present case by way of example, water, flows. A flow quantity or rate of the fluid flowing through the measuring section 2 is detected by using the fluid meter 1. In the exemplary embodiment shown, the fluid meter 1 is therefore configured as a water meter, which in the present case is, by way of example, an ultrasonic meter. The fluid meter can equally well be a magneto-inductive flow meter.

For better orientation, a coordinate system is depicted in each of the figures. In this case, the x-axis points along a longitudinal direction of the measuring section 2, which is rectilinear in the present case, the y-axis points along the transverse direction thereof, and, relative to the assembled state of the fluid meter 1, the z-axis points upwards counter to the direction of gravity.

The fluid meter 1 includes an electronics housing 3, in which an evaluation device 26 for evaluating a measurement signal of a measuring device 4 is disposed. Details regarding the electronics housing 3 or its components are explained further below.

Figure 3:
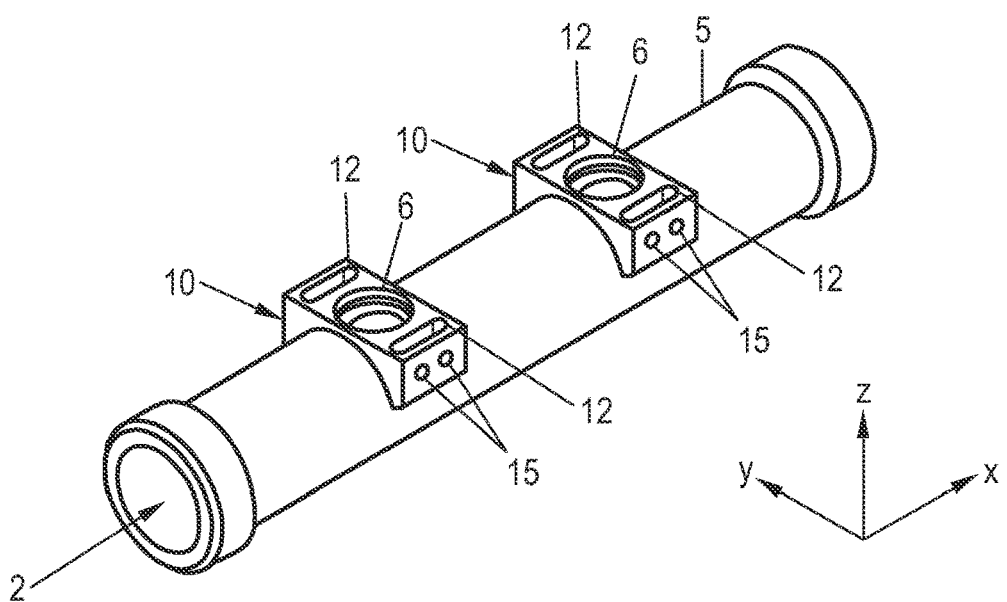
FIG. 3 is a perspective view of a measuring section part of the fluid meter of FIG. 1.

The fluid meter 1 includes a measuring section part 5, which forms the measuring section 2, wherein corresponding details can be seen in FIG. 3, which shows a perspective view of the measuring section part 5. In the present case, the measuring section part 5 is a tubular housing, the interior of which forms the tubular measuring section 2.

The measuring device 4, of which two are provided in the present exemplary embodiment, projects into the measuring section 2 through an opening 6 provided laterally on the measuring section 2 or the measuring section part 5. For sealing purposes, a sealing element 7 in the form of a sealing ring is inserted between the measuring device 4 and the measuring section part 5 in the region of the opening 6 (see FIG. 6).

The measuring device 4 includes an ultrasound generating device, not shown specifically, through the use of which ultrasonic waves can be generated as a measurement signal and emitted into the fluid, and an ultrasound detection device, likewise not shown specifically, through the use of which a measured value relating to the ultrasonic waves after passage through the fluid can be detected. On the basis of the measured value, the flow quantity or rate of the fluid through the measuring section 2 can be determined by the evaluation device 26. Alternatively, the measuring device 4 can be provided for detection of the flow quantity or rate by a magneto-inductive measuring method.

Figure 4:
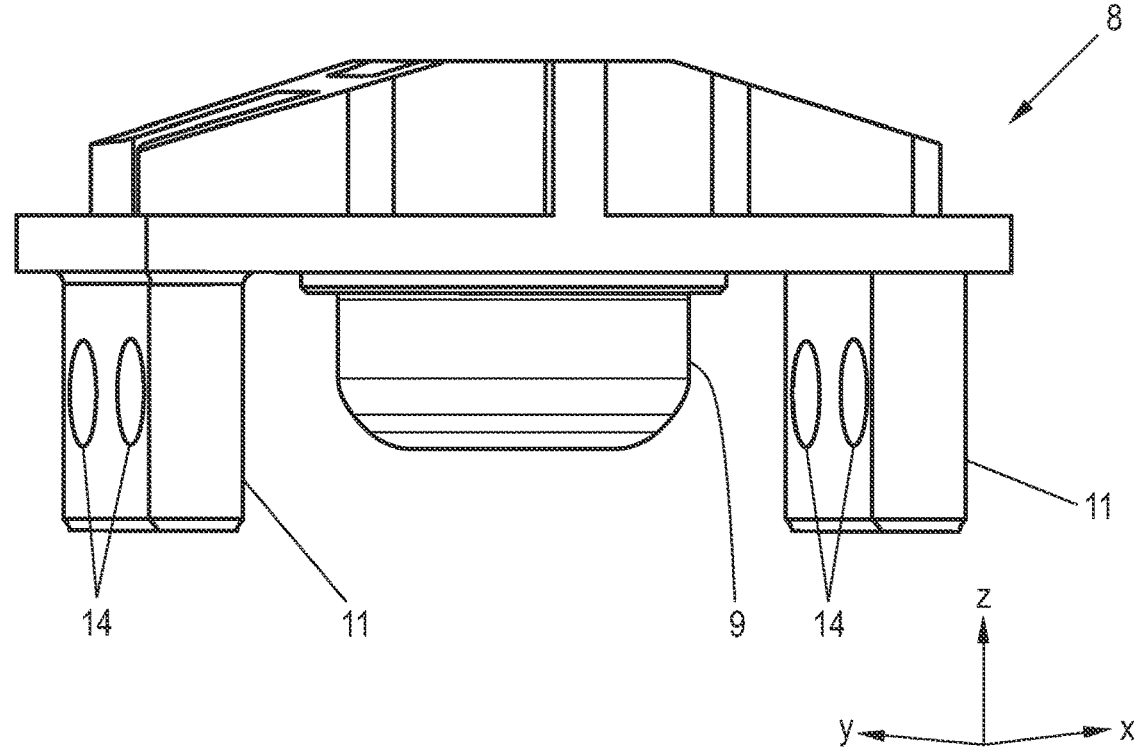
FIG. 4 is a fragmentary, perspective view of a measuring device fastening element of the fluid meter of FIG. 1.
Figure 5:
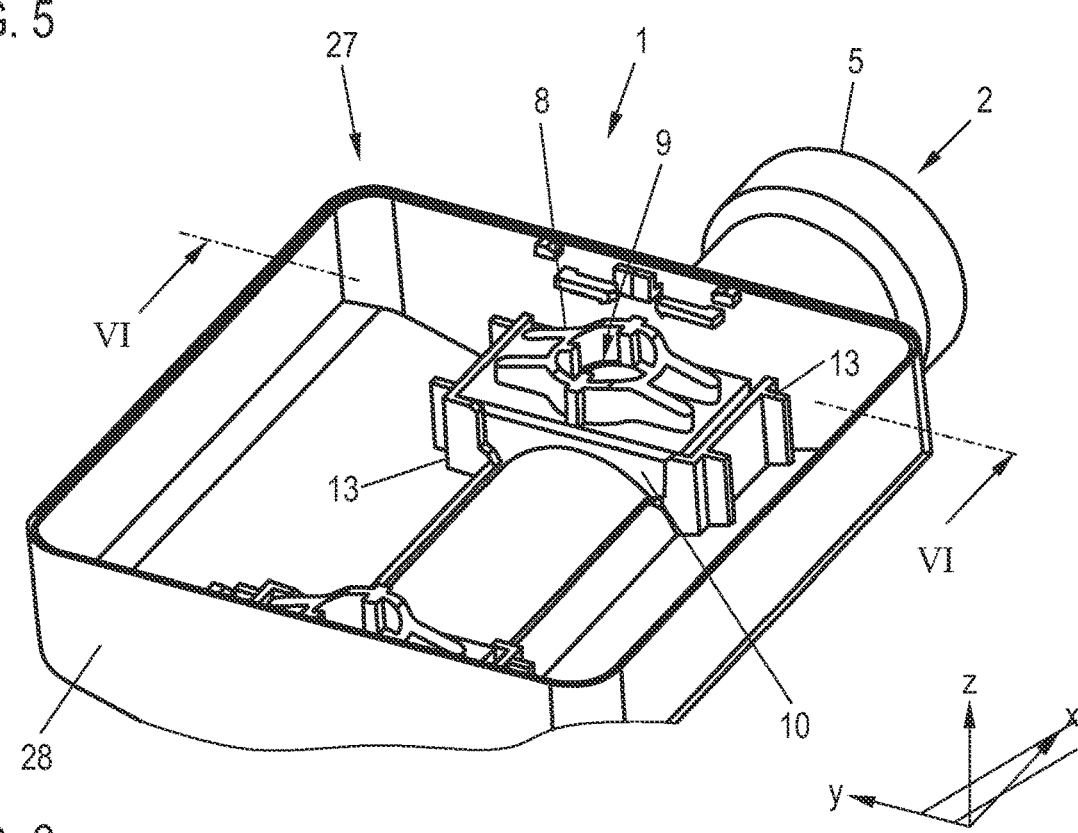
FIG. 5 is a perspective view of the fluid meter of FIG. 1 with the electronics housing removed.

The measuring devices 4 are each connected to a respective measuring device fastening element 8 made of a plastic. FIG. 4 shows a perspective illustration of the measuring device fastening element 8, which can also be referred to as a bracket. The measuring device fastening element 8 includes a pot-shaped section 9, into which the measuring device 4 is inserted and fastened, for example by adhesive bonding.

Furthermore, two measuring section fastening elements 10 are integrally formed on the measuring section part 5. A common component including the measuring section part 5 and the measuring section fastening elements 10 is formed of a metal. Alternatively, the measuring section part 5 and the measuring section fastening element 10 can be separate components which are fastened to one another.

The fastening elements 8, 10 are used to fasten the measuring device 4 and the measuring section part 5 to one another. This fastening serves, on the one hand, to dissipate forces acting from the outside without the measuring device becoming detached from the measuring section part 5. In particular, this fastening also serves to dissipate a force on the measuring device 4 caused by a pressure prevailing in the fluid.

Specifically, the measuring device fastening element 8 includes two webs 11, and the measuring section fastening element 10 includes two grooves 12, wherein in each case one of the webs 11 engages in one of the grooves 12. Thus, during the assembly of the fluid meter 1, the measuring device fastening element 8 is plugged onto or into the measuring section fastening element 10, with the web 11 being introduced into the groove 12.

As can be seen from FIGS. 2-6, the two webs 11 and the two grooves 12 are disposed on opposite sides of the measuring section part 5 in the final assembly position. Since, in the case of the fluid meter 1 according to the invention, two measuring device fastening elements 8 and two measuring section fastening elements 10 disposed along the measuring section 2 are provided in each case, a plurality of, namely two, pairs including in each case one measuring section fastening element 10 and one measuring device fastening element 8, are formed along the measuring section 2. In this case, the measuring device fastening element 8 is of plate-shaped configuration and the measuring section fastening element 10 is of block-shaped configuration, namely cuboidal, wherein the plate-shaped measuring device fastening element 8 rests on the block-shaped measuring section fastening element 10.

In order to fasten the measuring device 4 on the measuring section part 5, a plurality of locking elements 13 is provided in addition to the fastening elements 8, 10. During assembly, after the fastening elements 8, 10 have been plugged into one another, these locking elements are inserted or plugged into a receiving region 14 of the measuring device fastening element 8 and into a receiving region 15 of the measuring section fastening element 10. The fastening sections 14, 15 are bores which penetrate the web 11 and the walls of the groove 12 and which are aligned with one another in the assembled state of the fluid meter 1. Specifically, each web 11 and each groove 12 has two bores in each case. Correspondingly, the locking element 13 includes in each case two fastening pins 16 or bolts, which project parallel to one another from a flat or plate-shaped central section 17 of the locking element 13.

In order to fasten the measuring device 4 to the measuring section part 5, the fastening elements 8, 10 and the locking elements 13 form a form-locking connection, wherein fastening of these components, in particular screwless fastening, is made possible by virtue of the geometric shape of these components. In this case, the plug-in direction of the measuring device fastening element 8 and of the locking element 13 are at an angle to one another, this being clear especially from FIG. 6, which shows a sectional view through the fluid meter 1.

In order to secure the form-locking connection, in particular in order to prevent unauthorized opening or manipulation of the fluid meter 1, at least one of the components 8, 10, 13 has a latching section 39, which latches in during the insertion of the locking element 13 when the latter reaches the assembly position. With respect to the latching section 39, attention is drawn to the enlarged section of FIG. 6, in which an exemplary embodiment of the latching section 39 can be seen. Thus, a latching spring 18 is disposed on the front side of each of the fastening pins 16 and is pressed elastically against the pin wall when the fastening pin 16 is inserted into the bore. When the final assembly position is reached, the latching spring 18 passes a latching projection 19 and latches in behind it. Thus, release of the connection is only possible as a result of destruction, and therefore any manipulation of the fluid meter 1 that may have taken place is immediately apparent.

Figure 6:
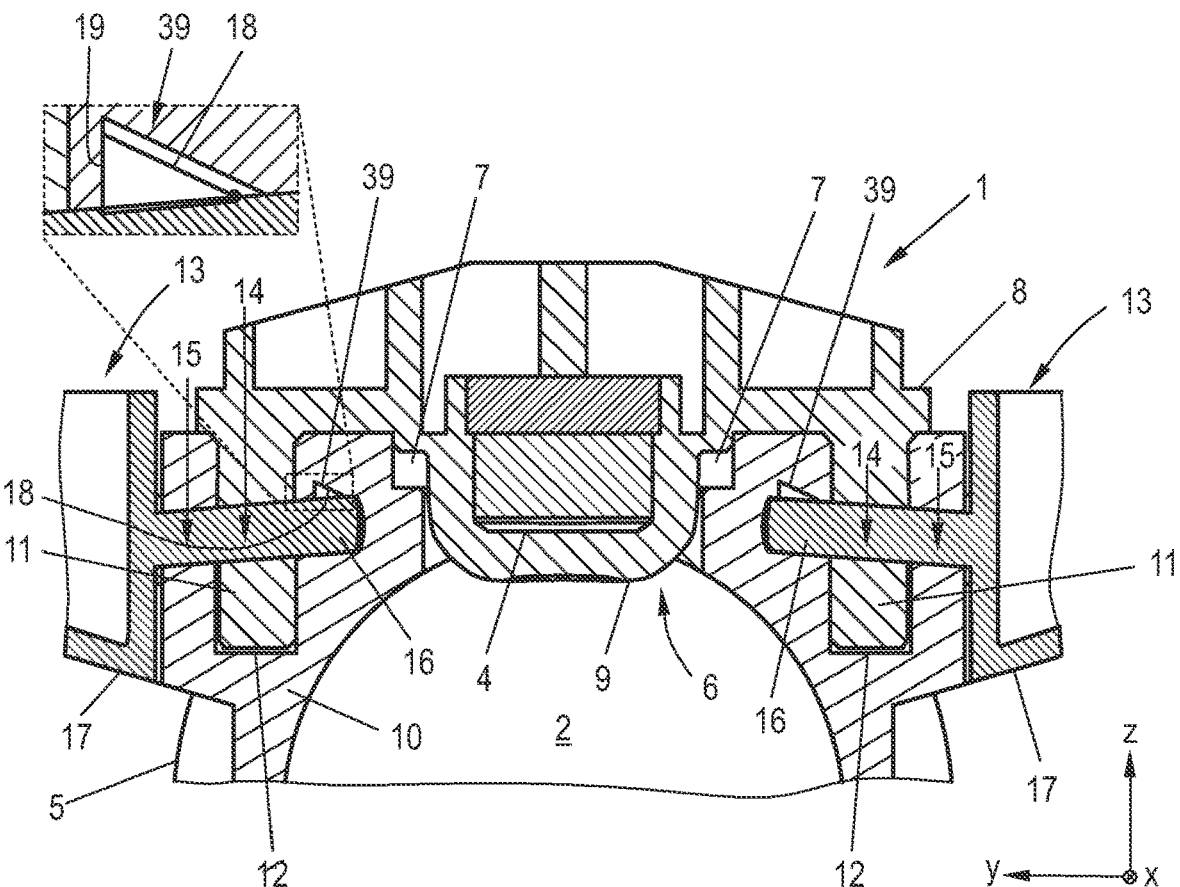
FIG. 6 is a sectional view of the fluid meter of FIG. 1, taken along a section line VI-VI of FIG. 5, in the direction of the arrows.

In the following description, one aspect with respect to the plug-in or plug-on direction of the measuring device fastening element 8 and of the locking element 13 is explained with reference to FIG. 6. Thus, these plug-in or plug-on directions can in principle be perpendicular to one another. In the exemplary embodiment shown, however, it is envisaged that these are at an angle to one another which differs from the right angle by a certain angular amount. This can be between 1° and 30°, in particular between 1° and 10°, and in the present case, by way of example, is approximately 5°. This angle deviating from a right angle prevents an elastic deformation of the components 8, 10, 13, which could be caused, for example, by the pressure in the fluid and can lead to a transverse force from automatically pushing the locking element out of the bores and accordingly releasing the form-locking connection. This is relevant especially because some of the components 8, 10, 13 are formed of a flexible plastic.

Figure 2:
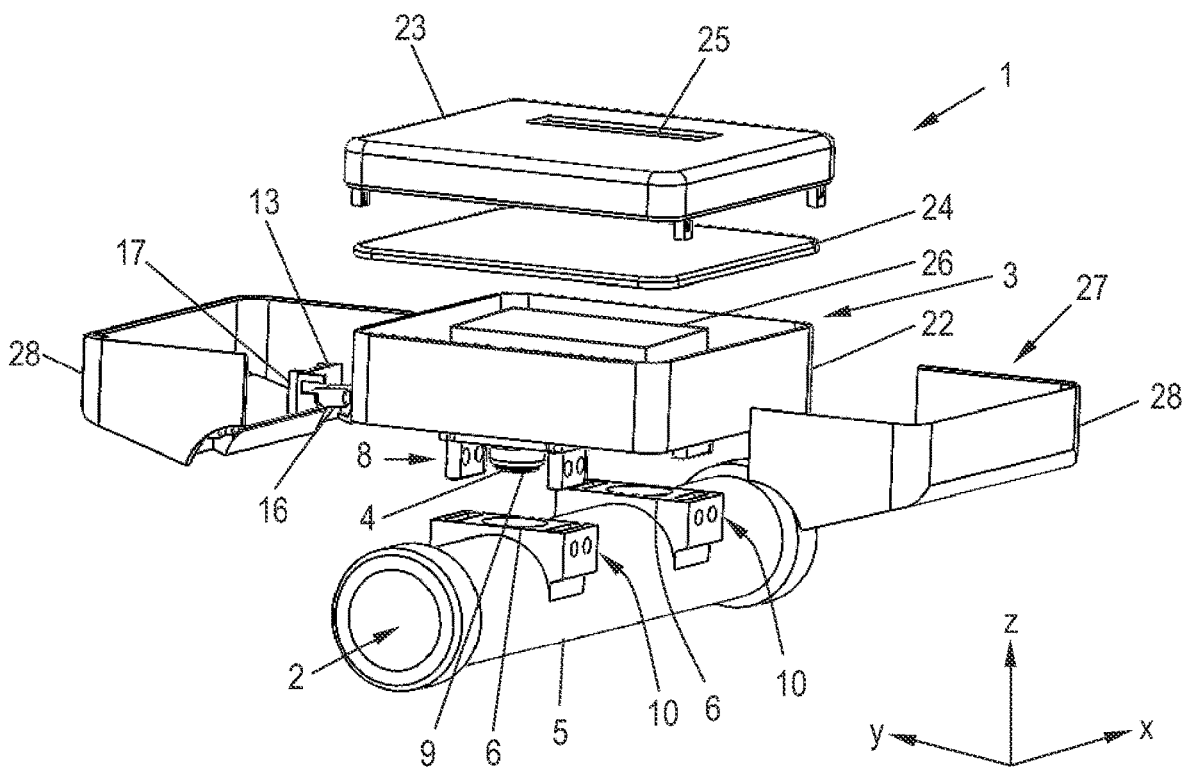
FIG. 2 is an exploded, perspective view of the fluid meter of FIG. 1.

In the following description, details of the electronics housing 3, which is sealed off from the outside in a fluid-tight manner by sealing devices (not shown specifically), are explained with reference to FIG. 2. Thus, the electronics housing 3 includes a main section 22, which forms a base surface and side surfaces, and a housing cover 23, which closes the electronics housing 3 at the top, wherein a transparent pane 24 is inserted between the main section 22 and the housing cover 23, making it possible to see the interior of the electronics housing 3 from the outside through a viewing window 25 of the housing cover 23, and enabling the current meter reading to be read off on the evaluation device 26.

A jacket housing 27 including, by way of example, two housing shells 28 surrounding the electronics housing 3 in sections, is furthermore provided. The electronics housing 3 and the jacket housing 27 thus provide a nested housing for the evaluation device 26. In order to simplify the assembly process, in each case one of the housing shells 28 and one of the locking elements 13 is configured as a common and one-piece component.

Figure 7:
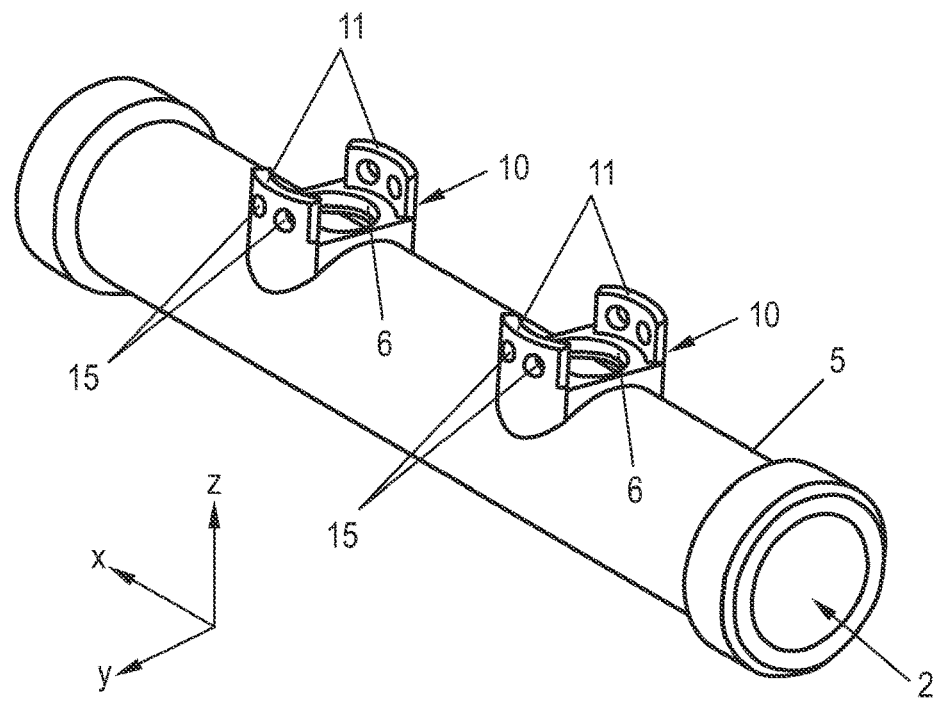
FIG. 7 is a perspective view of a measuring section part of a second exemplary embodiment of the fluid meter according to the invention.
Figure 8:
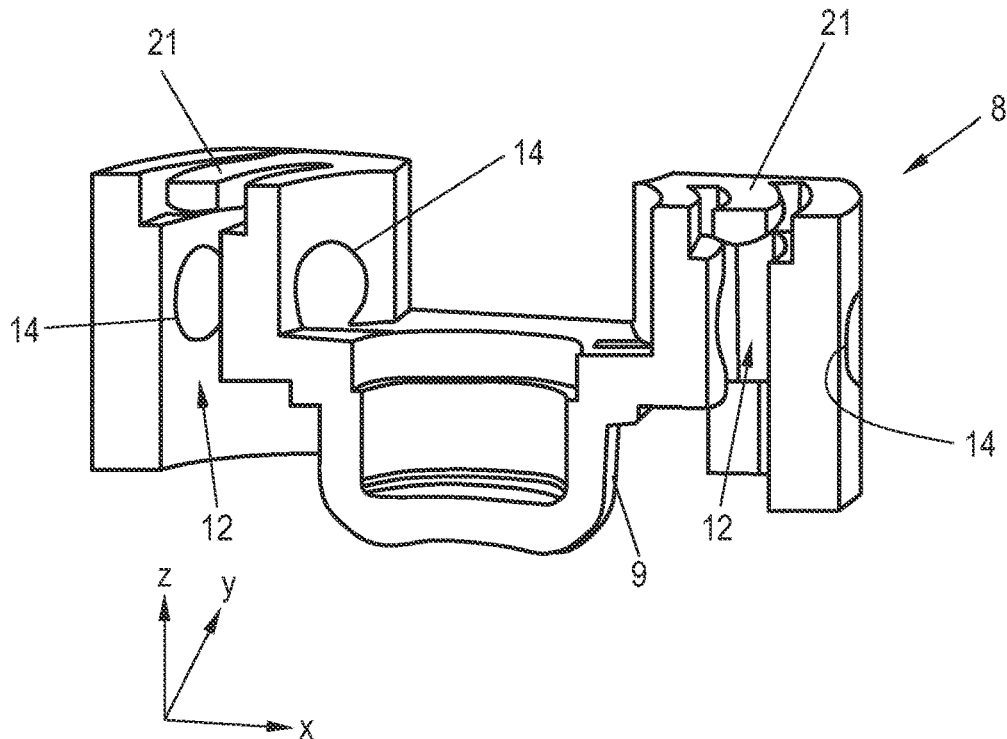
FIG. 8 is a sectional perspective view of a measuring device fastening element of the second exemplary embodiment of the fluid meter according to the invention.
Figure 9:
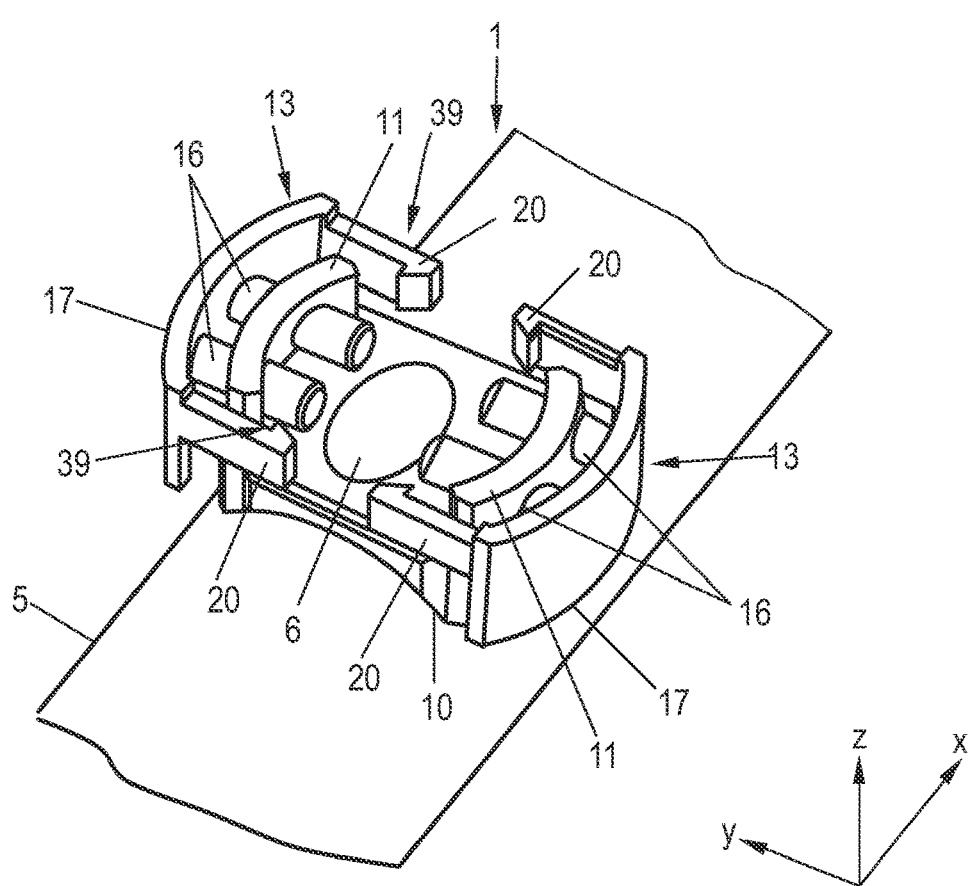
FIG. 9 is a fragmentary, perspective view of the second exemplary embodiment of the fluid meter according to the invention, in which the electronics housing and the measuring device fastening element are not illustrated.

A second exemplary embodiment of the fluid meter 1 according to the invention is explained below with reference to FIGS. 7-9. FIG. 7 shows the measuring section part 5, FIG. 8 shows the measuring device fastening element 8 and FIG. 9 shows a three-dimensional plan view of the measuring section fastening element 10 with the locking elements 13 inserted, and with the measuring device fastening element 8 not being illustrated for the sake of greater clarity. In principle, the aspects set out in connection with the first embodiment of the fluid meter 1 apply equally to the second exemplary embodiment, with differences being set out below.

Thus, in the second exemplary embodiment, it is envisaged that the measuring section fastening element 10 is of plate-shaped configuration and has two webs 11 in each case. The measuring device fastening element 8, on the other hand, is of block-shaped or cylinder-shaped configuration and in each case includes two grooves 12. As regards the groove-web connection, the fastening elements 8, 10 in this embodiment are therefore of reversed configuration as compared with the first embodiment.

As regards the latching section 39, it is envisaged that the locking element 13 has two latching arms 20, which are disposed laterally on the central section 17 and at the respective ends of which remote from the central section 17 latching hooks are provided, which latching hooks engage laterally around the measuring device fastening element 8 in the final assembly position.

With reference to FIG. 8, it can be seen that the measuring device fastening element 8 has elastic return elements 21 in the region of the grooves 12, more specifically at the respective groove bottom. In this specific case, these are configured as elastic spring arms. As the measuring device fastening element 8 is plugged into or onto the measuring section fastening element 10, the elastic return elements 21 are deformed or bent, generating an elastic restoring force. This has the effect that any component tolerances of the components 8, 10, 13 and play resulting therefrom are eliminated. In the assembled state, the elastic deformation of the elastic return elements 21 is held in position by the locking elements 13. Corresponding return elements 21 can also be provided as part of the first embodiment, namely, based on FIG. 6, in the region of the groove bottom of the groove 12, for example.

Figure 10:
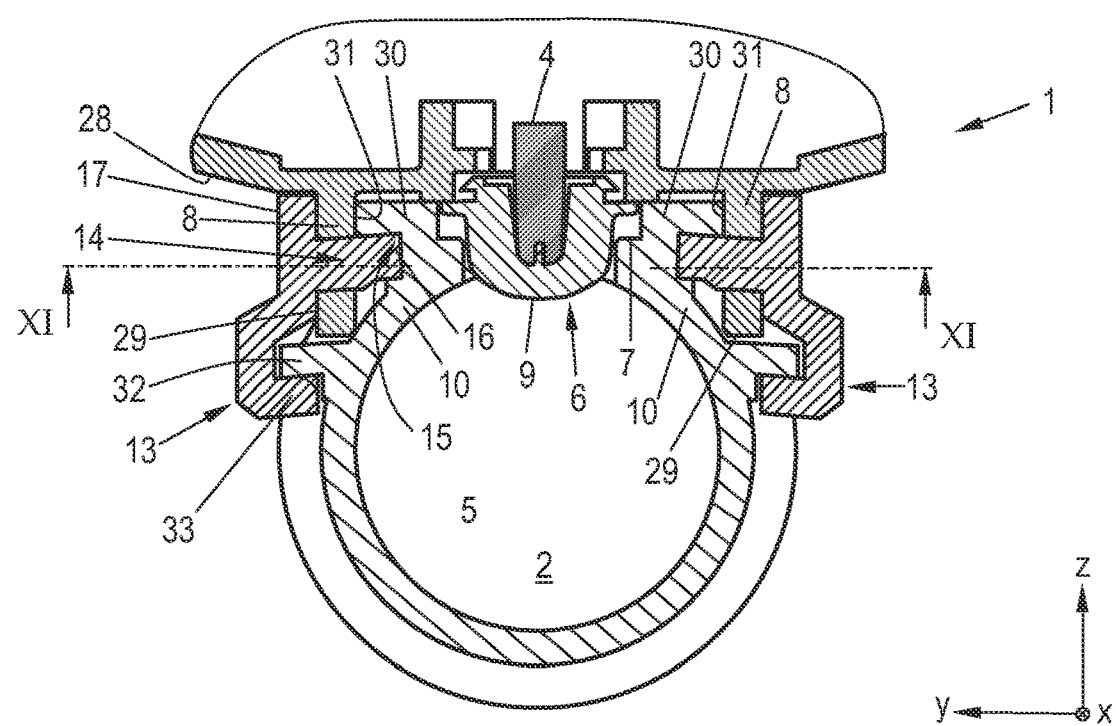
FIG. 10 is a cross-sectional view of a third exemplary embodiment of the fluid meter according to the invention.
Figure 11:
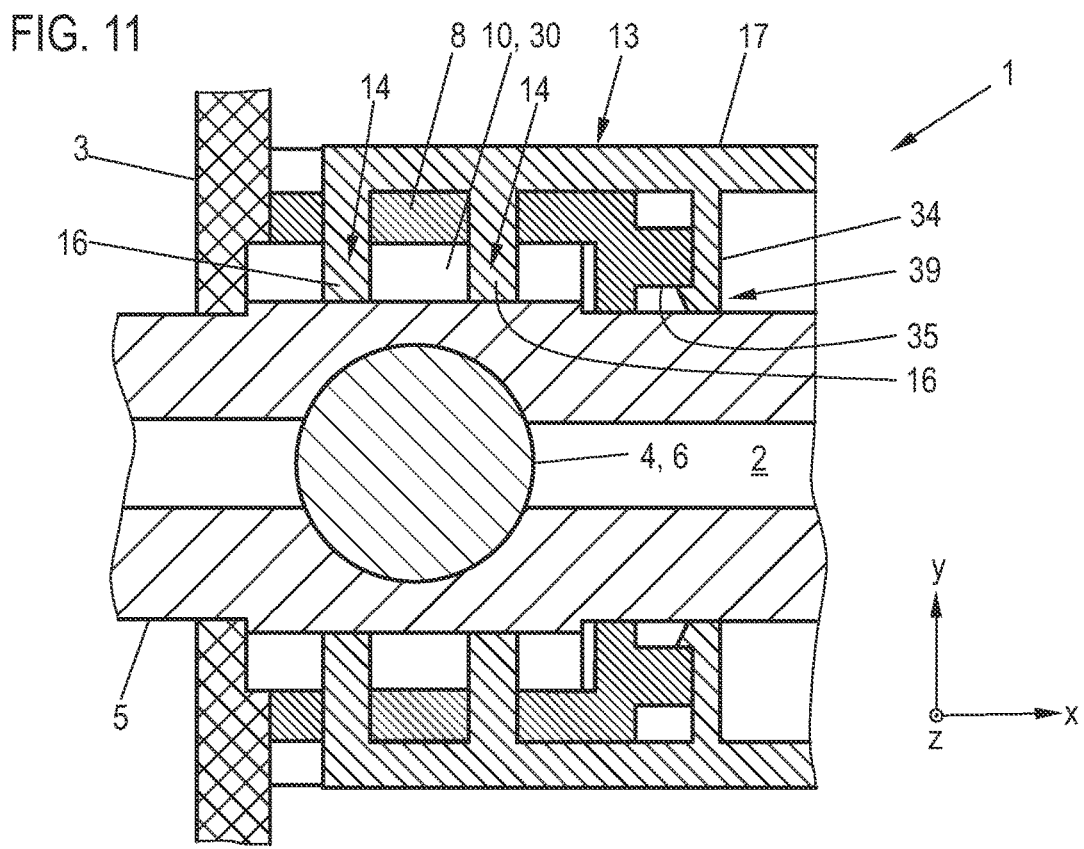
FIG. 11 is a fragmentary, longitudinal-sectional view of the third exemplary embodiment of the fluid meter according to the invention.

A third exemplary embodiment of the fluid meter 1 according to the invention is explained below with reference to FIGS. 10 and 11, wherein, in relation to the measuring section 2, FIG. 10 shows a cross section through the fluid meter 1, and FIG. 11 shows a longitudinal section through the fluid meter 1. In principle, the same applies to the third exemplary embodiment as to the first exemplary embodiment, with differences being explained below.

In this exemplary embodiment, the measuring device fastening element 8 includes two fastening ribs 29, and the measuring section fastening element 10 likewise includes two fastening ribs 30. Flanking the opening 6, the fastening ribs 29, 30 are disposed laterally opposite one another on the measuring section part and run parallel to one another with respect to their longitudinal axes. The fastening ribs 30 of the measuring section fastening element 10 have L shapes which, when viewed in cross section, face away from one another and are upside down in FIG. 10. The fastening ribs 29 of the measuring device fastening element 8 rest laterally against end faces 31 of the fastening ribs 30 of the measuring section fastening elements 10. The receiving region 14 of the measuring device fastening element 8 is configured as a bore. The receiving region 15 of the measuring section fastening element 10 is formed by the angled section of the L shape of the fastening rib 30. In this case, the fastening pin 16 engages through the receiving region 14 of the fastening element 8 of the measuring device and engages in the receiving region 15 of the measuring section fastening element 10.

The measuring section fastening element 10 furthermore has two additional ribs 32, which are disposed laterally and opposite one another on the measuring section part 5 and, to reinforce the form-locking connection, can each be surrounded by an angled section 33 on the end of the respective locking element 13.

As can be seen from FIG. 11, the locking element 13 further includes, for the implementation of the latching section 39, a latching arm 34 which engages around the measuring device fastening element 8 at the end through a latching projection 35.

As can be seen especially from FIG. 10, in the case of the fluid meter 1 shown therein, the housing shells 28 and the measuring device fastening element 8 are configured as a common component.

Figure 12:
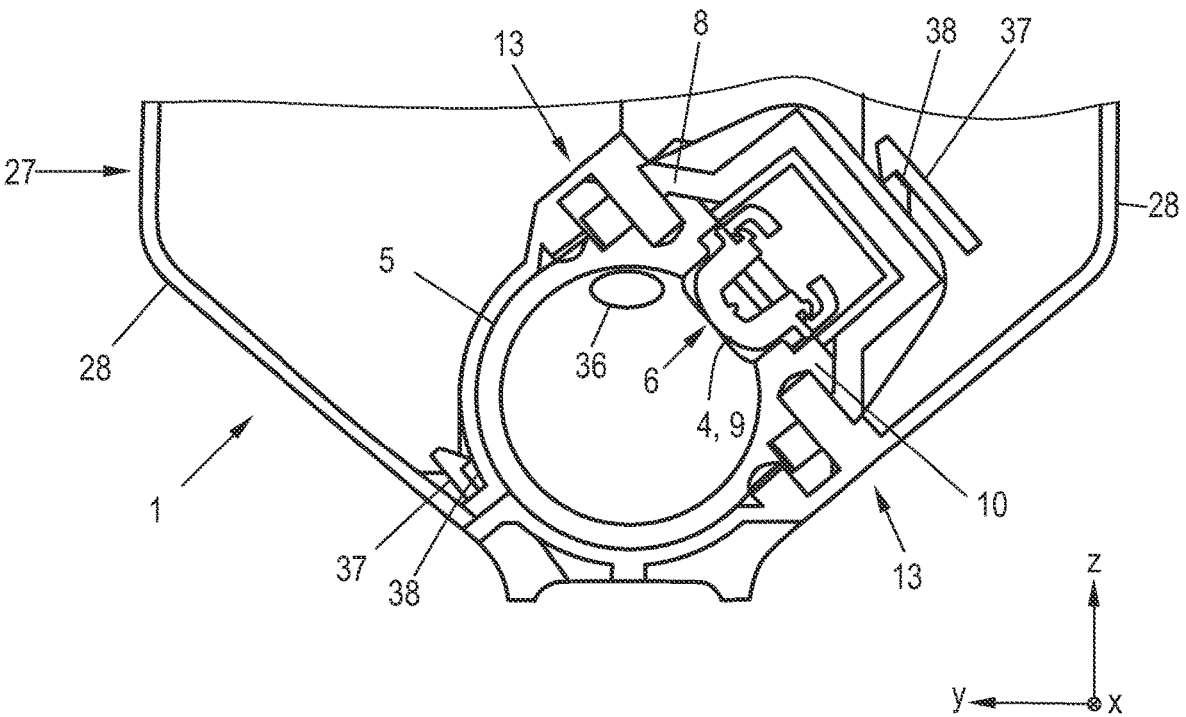
FIG. 12 is a fragmentary, cross-sectional view of a fourth exemplary embodiment of the fluid meter according to the invention.

A fourth embodiment of the fluid meter according to the invention is explained below with reference to FIG. 12. This figure shows a sectional view through this fluid meter 1. In principle, the fourth embodiment corresponds to the third embodiment explained with reference to FIGS. 10 and 11, with the differences being explained below. Thus, in the case of the fluid meter 1 shown in FIG. 12, the measuring device 4 is not disposed at the upper vertex of the measuring section part 5 relative to the direction of gravity in the assembly position, but instead is disposed laterally obliquely thereon, approximately at a 2 o'clock or 3 o'clock position. This ensures that any air bubble 36 in the fluid flowing through the measuring section 2 does not pass between the fluid and the measuring device 4, but that the measurement signal or the ultrasonic waves can in all cases be emitted directly into the fluid by the measuring device 4.

In this embodiment, the housing shells 28 are clearly not configured to be symmetrical with respect to one another. In order to further reinforce the form-locking connection, they have latching arms 37, which interact in a latching manner with latching projections 38 of the respective other housing shell 28 and of the measuring device fastening element 8.

The following is a summary list of reference numerals and the corresponding structure used in the above description of the invention.

LIST OF REFERENCE SIGNS

1 fluid meter
2 measuring section
3 electronics housing
4 measuring device
5 measuring section part
6 opening
7 sealing element
8 measuring device fastening element
9 pot-shaped section
10 measuring section fastening element
11 web
12 groove
13 locking element
14 receiving region
receiving region
16 fastening pin
17 central section
18 latching spring
19 latching projection
20 latching arm
21 return element
22 main section
23 housing cover
24 pane
25 viewing window
26 evaluation device
27 jacket housing
28 housing shell
29 fastening rib
30 fastening rib
31 end face
32 additional rib
33 angled section
34 latching arm
35 latching projection
36 air bubble
37 latching arm
38 latching projection
39 latching section

The invention claimed is:

1. A fluid meter for detecting at least one of a flow quantity or a flow rate of a fluid flowing through a measuring section, the fluid meter comprising:

at least one measuring section part forming or including the measuring section; and at least one measuring device fastened to said at least one measuring section part and projecting into the measuring section through an opening in said at least one measuring section part, said at least one measuring device configured to at least one of detect a measured value relating to at least one of the flow quantity or the flow rate or emit a measurement signal usable to detect the measured value;

at least one measuring device fastening element connected to or formed on said at least one measuring device, said at least one measuring device fastening element having a receiving region;

at least one measuring section fastening element fastened to or formed on said at least one measuring section part, said at least one at least one measuring section part having a receiving region;

said at least one measuring device fastening element being plugged onto said at least one measuring section fastening element or plugged at least sectionally in said at least one measuring section fastening element;

at least one locking element each plugged into a respective one of said receiving regions and forming a form-locking connection with said at least one measuring device fastening element and said at least one measuring section fastening element for fastening said at least one measuring device on said at least one measuring section part; and at least one of said at least one measuring device fastening element or said at least one measuring section fastening element having at least one elastic return element or an elastic spring arm being deformable and generating an elastic restoring force upon plugging said at least one measuring device fastening element into or onto said at least one measuring section fastening element.

2. The fluid meter according to claim 1, wherein said at least one locking element includes at least two locking elements disposed on opposite sides of said at least one measuring section part.

3. The fluid meter according to claim 2, wherein at least one of said at least one measuring device fastening element or said at least one measuring section fastening element is at least one fastening rib or has at least one fastening rib.

4. The fluid meter according to claim 3, wherein:

said at least one measuring section fastening element includes two fastening ribs disposed on opposite sides of said at least one measuring section part and having L shapes facing away from one another when viewed in cross section;

said at least one measuring device fastening element includes two fastening ribs which, when viewed in cross section, run parallel to one another and have sides resting in each case against a respective end face of one of said fastening ribs of said at least one measuring section fastening element;

said locking elements each engage through said receiving region of a respective measuring device fastening element;

said receiving region of said measuring device fastening element is configured as at least one bore, and engages in said receiving region of said at least one measuring section fastening element; and said receiving region of said at least one measuring section fastening element is delimited by an angled section of said L shape of said at least one measuring section fastening element.

5. The fluid meter according to claim 1, wherein at least one of said at least one measuring device fastening element or said at least one measuring section fastening element or said at least one locking element includes at least one latching section latching upon plugging in said at least one locking element to secure said form-locking connection.

6. The fluid meter according to claim 1, wherein said at least one measuring section part is a housing forming the measuring section in a tubular shape.

7. The fluid meter according to claim 1, wherein said at least one locking element is at least one fastening pin or includes at least one fastening pin, and at least one of said receiving regions is a bore or includes a bore into which said fastening pin engages or through which said fastening pin engages.

8. The fluid meter according to claim 7, wherein said at least one fastening pin includes a plurality of fastening pins, and said at least one locking element has a flat or plate-shaped central section from which said plurality of fastening pins project parallel to one another.

9. The fluid meter according to claim 1, wherein a plug-in or plug-on direction of said at least one measuring device fastening element onto said at least one measuring section fastening element and a plug-in direction of said at least one locking element into said receiving regions are perpendicular to one another or at an angle to one another differing from a right angle by an angular amount being between 1° and 30°.

10. The fluid meter according to claim 9, wherein said angular amount is 5°.

11. The fluid meter according to claim 1, wherein:

one of said at least one measuring device fastening element or said at least one measuring section fastening element is at least one web or includes at least one web;

another of said at least one measuring device fastening element or said at least one measuring section fastening element is at least one groove or includes at least one groove; and said web engages in said groove.

12. The fluid meter according to claim 11, wherein:

said fastening element being said groove or a plurality of grooves has a block-shaped configuration;

said fastening element being said web or a plurality of webs has a plate-shaped or dish-shaped configuration; and said plate-shaped or dish-shaped fastening element rests on said block-shaped fastening element.

13. The fluid meter according to claim 1, wherein said at least one measuring device fastening element and said at least one measuring section fastening element include a plurality of pairs each including a measuring section fastening element and a measuring device fastening element being disposed along the measuring section and disposed on said at least one measuring section part.

14. The fluid meter according to claim 1, which further comprises:

an electronics housing having a main section forming a base surface and side surfaces, and a housing cover closing said electronics housing at a top; and at least one evaluation device disposed in said electronics housing, connected to said at least one measuring device and configured for evaluating the measurement signal.

15. The fluid meter according to claim 14, which further comprises a jacket housing having at least one housing shell surrounding said electronics housing at least in some section or sections, said housing shell and said at least one locking element or one of said at least one measuring device fastening element or said at least one measuring section fastening element, being a common or one-piece component.

16. The fluid meter according to claim 1, wherein the fluid meter is an ultrasonic meter or a magneto-inductive flow meter or a water meter.

17. A method for assembling a fluid meter for detecting at least one of a flow quantity or a flow rate of a fluid flowing through a measuring section, the method comprising:

providing a fluid meter having at least one measuring section part forming or including the measuring section and at least one measuring device fastened to the at least one measuring section part and projecting into the measuring section through an opening in the at least one measuring section part;

using the at least one measuring device to at least one of detect a measured value relating to at least one of the flow quantity or the flow rate or emit a measurement signal usable to detect the measured value;

providing at least one measuring device fastening element connected to the at least one measuring device or formed on the at least one measuring device, the at least one measuring device fastening element having a receiving region;

providing at least one measuring section fastening element fastened to the at least one measuring section part or disposed on the at least one measuring section part, the at least one measuring section fastening element having a receiving region;

plugging the at least one measuring device fastening element onto the at least one measuring section fastening element or plugging the at least one measuring device fastening element at least sectionally into the at least one measuring section fastening element, to fasten the at least one measuring device on the at least one measuring section part;

then plugging at least one locking element into each respective receiving region of the at least one measuring device fastening element and the at least one measuring section fastening element, forming a form-locking connection with the at least one measuring device fastening element and the at least one measuring section fastening element; and providing at least one of the at least one measuring device fastening element or the at least one measuring section fastening element with at least one elastic return element or an elastic spring arm being deformable and generating an elastic restoring force upon plugging the at least one measuring device fastening element into or onto the at least one measuring section fastening element.

* * * * *